United States Patent
Milavsky et al.

(10) Patent No.: US 11,838,571 B2
(45) Date of Patent: Dec. 5, 2023

(54) APPARATUS AND METHODS TO ESTIMATE MEDIA AUDIENCE CONSISTENCY

(71) Applicant: The Nielsen Company (US), LLC, New York, NY (US)

(72) Inventors: Joseph Gregory Milavsky, Dunedin, FL (US); Luc Zio, New Port Richey, FL (US); Edmond Wong, New York, NY (US); John A. Mann, Clearwater, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/192,595

(22) Filed: Mar. 4, 2021

(65) Prior Publication Data

US 2022/0286722 A1 Sep. 8, 2022

(51) Int. Cl.
*H04N 7/173* (2011.01)
*H04N 21/242* (2011.01)
*G06F 9/38* (2018.01)
*H04N 21/6405* (2011.01)

(52) U.S. Cl.
CPC ......... *H04N 21/242* (2013.01); *G06F 9/3836* (2013.01); *H04N 21/6405* (2013.01)

(58) Field of Classification Search
CPC ............. H04N 21/242; H04N 21/6405; H04N 21/44224; G06Q 30/0242; G06Q 30/0246; G06Q 30/0269
See application file for complete search history.

(56) References Cited

U.S. PATENT DOCUMENTS

| | | | |
|---|---|---|---|
| 5,481,294 A | 1/1996 | Thomas et al. | |
| 6,810,356 B1 | 10/2004 | Garcia-Franco et al. | |
| 8,370,489 B2* | 2/2013 | Mazumdar | G06Q 30/0201 709/224 |
| 9,967,633 B1* | 5/2018 | Matz | H04H 60/63 |
| 2002/0075320 A1 | 6/2002 | Kurapati | |
| 2013/0262181 A1* | 10/2013 | Topchy | G06Q 30/0202 705/7.31 |
| 2015/0279231 A1* | 10/2015 | Kuo | A61B 5/1124 702/19 |
| 2017/0193546 A1* | 7/2017 | Bennett | G06Q 30/0201 |
| 2018/0184170 A1* | 6/2018 | Stathacopoulos | H04N 21/252 |
| 2018/0205990 A1* | 7/2018 | Matthews | G06F 16/2379 |
| 2018/0249211 A1* | 8/2018 | Sheppard | G06Q 30/0201 |
| 2020/0074502 A1* | 3/2020 | Kishimoto | H04N 21/23424 |

* cited by examiner

*Primary Examiner* — Gigi L Dubasky

(57) ABSTRACT

Methods, apparatus, systems and articles of manufacture are disclosed to estimate media audience consistency. An example apparatus disclosed herein includes a record manager to access media measurement data communicated via a network from a plurality of media monitors, the media measurement data corresponding to a plurality of panelists. The apparatus further includes a consistency calculator to determine a first number of the panelists exposed to a first quantity of a first broadcast, determine a second number of the panelists exposed to a second quantity of the first broadcast, and output a consistency metric associated with the first broadcast, the consistency metric being based on a variation of at least the first number and the second number.

20 Claims, 6 Drawing Sheets

| | BROADCAST RANK | REACH PERCENT | VIEWED 25% | VIEWED 50% | VIEWED 75% | VIEWED 100% | CONSISTENCY METRIC |
|---|---|---|---|---|---|---|---|
| BROADCAST #1 | 1 | 4.7 | 6333377 | 5234261 | 3685783 | 2074252 | .428 |
| BROADCAST #2 | 2 | 4.7 | 6023618 | 5016879 | 3577656 | 1926228 | .431 |
| BROADCAST #3 | 3 | 4.7 | 2872987 | 2019996 | 1293911 | 400262 | .638 |
| BROADCAST #4 | 4 | 4.7 | 7869855 | 6730668 | 5554773 | 2586279 | .399 |

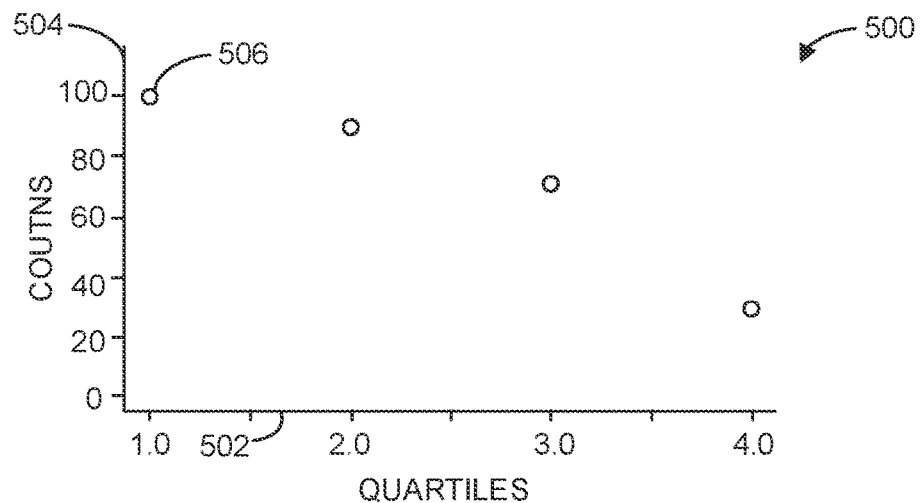
FIG. 5A
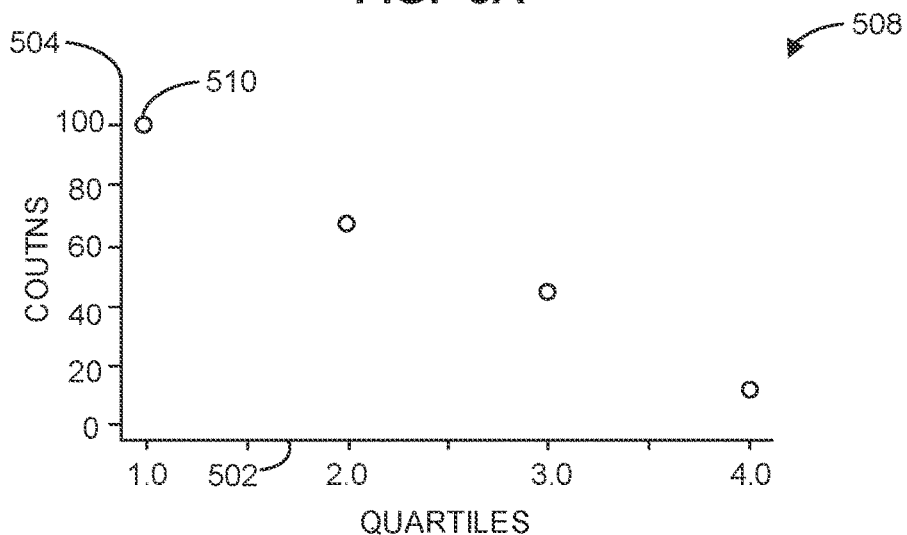
FIG. 5B
|  | BROADCAST RANK | REACH PERCENT | VIEWED 25% | VIEWED 50% | VIEWED 75% | VIEWED 100% | CONSISTENCY METRIC |
|---|---|---|---|---|---|---|---|
| BROADCAST #1 | 1 | 4.7 | 6333377 | 5234261 | 3685783 | 2074252 | .428 |
| BROADCAST #2 | 2 | 4.7 | 6023618 | 5016879 | 3577656 | 1926228 | .431 |
| BROADCAST #3 | 3 | 4.7 | 2872987 | 2019996 | 1293911 | 400262 | .638 |
| BROADCAST #4 | 4 | 4.7 | 7869855 | 6730668 | 5554773 | 2586279 | .399 |
FIG. 5C

APPARATUS AND METHODS TO ESTIMATE MEDIA AUDIENCE CONSISTENCY

FIELD OF THE DISCLOSURE

This disclosure relates generally to audience measurement, and, more particularly, to apparatus and methods to estimate media audience consistency.

BACKGROUND

One function of audience measurement entities is to gather and analyze data to quantify audience exposures to media. In recent years, media consumption has shifted to occur more frequently on a wide range of devices and platforms. Overall exposure to individual broadcasts has often decreased while media availability has increased, with audiences switching among broadcasts more frequently.

BRIEF DESCRIPTION OF THE DRAWINGS

FIG. 5A is a third plot illustrating example audience member exposure to quantities of intervals of an example third broadcast.

FIG. 5B is a fourth plot illustrating example audience member exposure to quantities of intervals of an example fourth broadcast.

FIG. 5C is a table including example audience measurement metrics including example consistency metrics calculated based on techniques disclosed herein.

Figure 1:
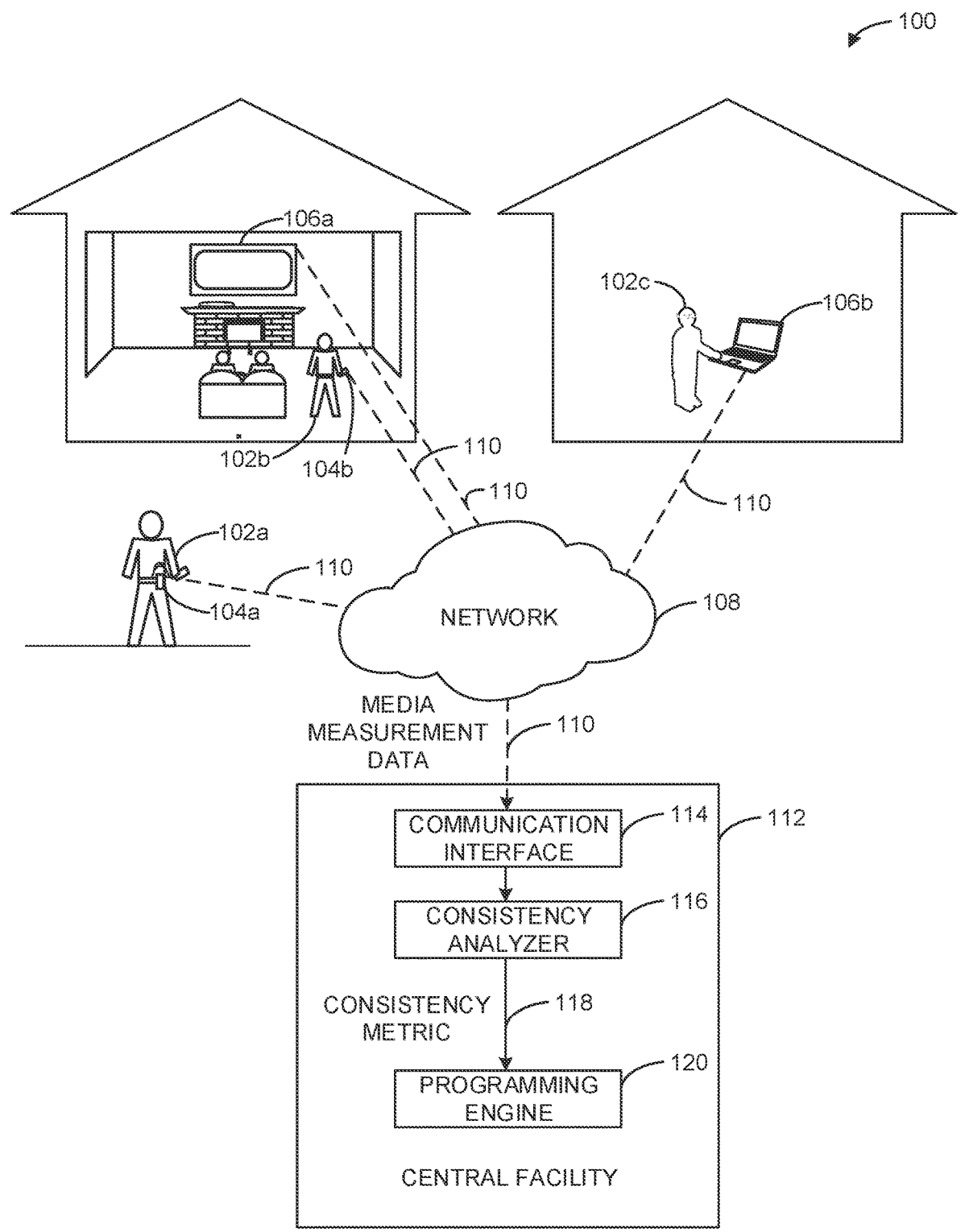
FIG. 1 is a schematic illustration of an example media monitoring environment including an example central facility constructed in accordance with the teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/− 1 second.

In some examples disclosed herein, scenarios are described in which broadcast media is "television program(s)" or "program(s)." Additionally, in examples disclosed herein, people/panelists exposed to the broadcast media (e.g., programs) are referred to as "viewers," and the audience of the broadcast media is referred to as "viewership." However, the examples are not limited to viewers of television programs, and also apply to listeners of radio programs, as well as people/panelists exposed to other types of media. As such, depending on the context in which the examples disclosed techniques are used, the term program may be replaced with any type of media (e.g., radio program, commercial, movie, etc.) and the term viewer can be replaced with any appropriate term referencing a person exposed to the media (e.g., listener, game player, etc.).

DETAILED DESCRIPTION

Traditionally, audience measurement entities determine audience engagement levels for media programming and/or advertisements based on registered panel members. That is, an audience measurement entity enrolls people, who consent to being monitored, into a panel. The audience measurement entity then monitors those panel members to collect media measurement data identifying media (e.g., television programs, radio programs, movies, DVDs, etc.) presented to those panel members. In this manner, the audience measurement entity can determine exposure measures for different media (e.g., content and/or advertisements) based on the collected media measurement data. As used herein, the term "media" includes any type of content and/or advertisement delivered via any type of distribution medium. Thus, media includes television programming or advertisements, radio programming or advertisements, movies, web sites, streaming media, etc.

One traditional metric utilized to quantify overall exposure to a broadcast is a rating. In one technique to determine a rating, an audience measurement entity determines a percent of the overall potential audience that was exposed to a broadcast on an average minute of the broadcast. Thus, if the entire audience was exposed to an entire broadcast, the rating would be 100%. However, given the number of competing broadcasts (e.g., on different channels, etc.) available, modern ratings are typically much lower than 100% (e.g., between 0-50%, etc.). In some instances, ratings are calculated based on viewing data collected at regular intervals (e.g., daily) from media monitoring devices and/or self-reporting from panelists.

Another traditional metric utilized to quantify exposure is reach. In one technique, reach is defined by how many people were exposed to (e.g., watched) at least a specified interval (e.g., one minute, six minutes, etc.) of a broadcast. Reach thus may have a relatively low barrier of exposure duration, counting exposures that may be as short as the minimum threshold. As its name implies, reach provides insight into how many individual people were exposed to the media, without particular consideration to how long these people stayed with the broadcast.

In the traditional media environment where most media was broadcast by major networks via cable, antenna, or satellite technologies, media consumption was often relatively homogeneous. Prior to the 1990s, very popular broadcasts (e.g., championship sporting events, etc.) could attain ratings of above 30% and very high reach numbers, easily helping differentiate these broadcasts from others which may have much lower exposure statistics. Modern day ratings are typically less than 10%, even for popular broadcasts. Numerous organizations rely on exposure metrics such as ratings and/or reach to make decisions about advertising spending, programming, audience trends, and numerous other objectives.

However, in recent years, due to the rapid proliferation of media platforms and devices, people are now being exposed to a far greater variety of media. For example, people may view shows, movies, performances and/or other media formats via smart phones, tablets, watches, televisions, computers, gaming consoles, and/or numerous other devices. Further, with increased wireless connectivity, media consumption is not limited to the household, where some traditional monitoring was focused. Also, instead of a few major networks distributing media via a few main channels, numerous applications, subscription services, websites, and/ or other platforms have greatly expanded the accessibility of expansive libraries of media content. As a result of these changes, rating values have reduced in some scenarios (e.g., rarely exceeding 6-7% in those scenarios), with the vast majority of broadcasts in such scenarios having similar rating numbers. Similarly, reach numbers may be lower in such scenarios due to the increased media offerings. Therefore, in such modern media environment scenarios, when analyzing a program on the basis of traditional exposure metrics, it can be difficult to differentiate between a program that is performing well (e.g., reaching a large, consistent audience) and one which is not.

Traditional media metrics usually do not provide information on how the audience may have changed throughout a broadcast. Further, with the proliferation of media devices, not all systems are capable of reliably reporting the data required for calculation of traditional exposure metrics. Moreover, the wide range of new media content often has different overall durations, rather than the standardized timeslots of traditional media (e.g., 30 minutes, 60 minutes, etc.). Traditional metrics fail to account for these recent changes in media.

Example methods, systems, and articles of manufacture are disclosed herein to estimate media audience consistency. In some example methods, systems and articles of manufacture disclosed herein, a consistency metric is calculated to characterize the behavior of an audience throughout a duration of a broadcast. The consistency metric provides insight into how the audience changes throughout the duration of a broadcast (sometimes referred to herein as the "holding power" of a broadcast).

In some example techniques disclosed herein, media measurement data is analyzed to determine intervals of a broadcast to which panelists were exposed. Example apparatus, methods, systems, and articles of manufacture disclosed herein compute a consistency metric based on a variance in the number of intervals to which viewers were exposed, which corresponds to a variance of the panelists' exposure (e.g., viewing) duration for the broadcast. In some examples, the consistency metric is omnidirectional; it represents the overall holding power of a given broadcast program, regardless of whether the change in audience exposure, such as viewership, is due to a decrease in viewership as a broadcast progresses (e.g., due to viewers leaving the broadcast), or an increase (e.g., due to viewers arriving late to a broadcast, such as to see the end of a sporting event, game show, etc.).

In some example techniques disclosed herein, the consistency metric is calculated based on a coefficient of variation, to capture the variance relative to the mean number of viewers of the given program of interest. In some examples disclosed herein, consistency metrics can be calculated at different intervals based upon the desired use case for applying the metrics. For example, in instances where advertising budgets are being allocated, and selection of specific times for placement of an ad in a program are not allowed, a consistency metric representing the entire broadcast may be calculated. Conversely, in a dynamic advertisement placement model, such as one where pricing is dependent on the time placement of the advertisement, numerous shorter-term consistency metrics may be calculated to represent the change in viewership during specific portions of a broadcast. Consistency metrics may additionally or alternatively be calculated for an individual commercial, an individual telecast, combined programs, dayparts, and/or any other grouping of programming.

In some example techniques disclosed herein, consistency metrics are directly utilized to adjust advertising scheduling. In some examples disclosed herein, consistency metrics are utilized to adjust programming schedules. For example, the consistency metrics disclosed herein can enable a network to analyze the loyalty of an audience of a particular program by comparison of consistency metrics across numerous episodes. In some examples disclosed herein, consistency metrics can be used to estimate multiple advertising campaigns overall effectiveness based on the holding power across multiple episodes. In some examples disclosed herein, consistency metrics can be used to compare different advertising agencies efficacies based on analyzing how the respective programming schedules maximize audience consistency. In some examples disclosed herein, advertisements can be selected based on programs with lower ratings or reach into a specific audience. In some examples disclosed herein, programs with lower consistency metrics can be deemphasized.

FIG. 1 is a schematic illustration of an example media monitoring environment 100 including an example central facility 112 constructed in accordance with the teachings of this disclosure. The example media monitoring environment 100 includes example panelists 102a, 102b, 102c, example media monitoring devices 104a, 104b, example media devices 106a, 106b, an example network 108, the example central facility 112, an example communication interface 114, an example consistency analyzer 116, and an example programming engine 120.

The panelists 102a, 102b, 102c of the illustrated example of FIG. 1 are people whose media exposure is monitored. The panelists 102a, 102b, 102c are users registered on panels maintained by a ratings entity (e.g., an audience measurement company) that owns and/or operates the ratings entity subsystem. Traditionally, audience measurement entities (AMEs, also referred to herein as "ratings entities"), determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

People (e.g., households, organizations, etc.) register as panelists via, for example, a user interface presented on a media device (e.g., via a website). People may be recruited as panelists in additional or alternative manners such as, for example, via a telephone interview, by completing an online survey, etc. Additionally or alternatively, people may be contacted and/or enlisted to join a panel using any desired methodology (e.g., random selection, statistical selection, phone solicitations, Internet advertisements, surveys, advertisements in shopping malls, product packaging, etc.).

The media monitoring devices 104a, 104b of the illustrated example of FIG. 1 are devices that measure, collect, store and/or communicate information about media exposure. In some examples, the media monitoring devices 104a, 104b may be referred to as "media monitors." In some examples, the first media monitoring device 104a is a portable monitoring device, capable of collecting information about media to which the first panelist 102a is exposed when outside his or her home. The second media monitoring device 104b is implemented via a device in the home. For example, the second panelist 102b may enter identifying information into a remote controller or other input device to indicate which member of the household is currently using the first media device 106a. In some examples, the media monitoring devices 104a, 104b may collect example media measurement data 110 based on user inputs, audio signatures, video signatures, codes/watermarks, recordings and/or any other monitoring technology.

In some examples, the media monitoring devices 104a, 104b may be implemented as software. In some such examples, the media monitoring devices 104a, 104b may be installed on media devices (e.g., smartphones, televisions, gaming consoles, tablets, etc.) to enable tracking of media exposure and communication of the media measurement data 110 to the central facility 112. In some examples, the media monitoring devices 104a, 104b are standalone devices placed near media devices. In some examples, the media monitoring devices 104a, 104b are coupled to media devices to obtain information about media displayed on these devices.

The example media devices 106a, 106b of the illustrated example of FIG. 1 are devices used to present media. The first media device 106a of the illustrated example is a television. The second media device 106b of the illustrated example is a laptop computer. In some examples, the media devices 106a, 106b are capable of directly presenting media (e.g., via a display) while, in other examples, the media devices 106a, 106b present media on separate media presentation equipment (e.g., speakers, a display, etc.). Thus, as used herein "media devices" may or may not be able to present media without assistance from a second device. Media devices are typically consumer electronics. While in the illustrated example of FIG. 1, a television and a laptop computer are shown, any other type(s) and/or number(s) of media device(s) 106a, 106b may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, radios, etc., may additionally or alternatively be used.

As previously described, in some examples, the media devices 106a, 106b may include the media monitoring devices 104a, 104b. Additionally, while the media devices 106a, 106b are illustrated inside of households, media devices may be encountered outside of households (e.g., via a radio, via a streaming device, etc.), and the associated media exposure may be captured by a media monitoring device, such as the first media monitoring device 104a.

The network 108 of the illustrated example of FIG. 1 is the Internet. However, the example network 108 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 108 enables the example media monitoring devices 104a, 104b and/or the media devices 106a, 106b to be in communication with the central facility 112. The example media monitoring devices 104a, 104b communicate the media measurement data 110 to the central facility 112 via the network 108.

The media measurement data 110 of the illustrated example of FIG. 1 includes data indicating exposure to media programs. In some examples, the media measurement data may be communicated from the media monitoring devices 104a, 104b and/or the media devices 106a, 106b at regular intervals (e.g., hourly, daily, etc.) or continuously. In some examples, the media measurement data 110 is preprocessed by the media monitoring devices 104a, 104b, and/or the media devices 106a, 106b to include information such as a number of intervals of a broadcast that were presented, durations of broadcasts presented, and/or any other calculations based on the raw measurement data. In some examples, the media measurement data 110 includes direct media measurements (e.g., signatures, watermarks, user inputs, etc.).

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

The central facility 112 of the illustrated example of FIG. 1 is one or more server(s) that collect and process media monitoring information to generate exposure metrics related to presented media. The central facility 112 analyzes the media monitoring information to identify, for example, which media devices are the most owned, the most-frequently used, the least-frequently owned, the least-frequently used, the most/least-frequently used for particular type(s) and/or genre(s) of media, and/or any other media statistics or aggregate information that may be determined from the data. The media device information may also be correlated or processed with factors such as geodemographic data (e.g., a geographic location of the media exposure measurement location, age(s) of the panelist(s) associated with the media exposure measurement location, an income level of a panelist, etc.) Media device information may be useful to manufacturers and/or advertisers to determine which features should be improved, determine which features are popular among users, identify geodemographic trends with respect to media devices, identify market opportunities, and/or otherwise evaluate their own and/or their competitors' products.

In some examples, the central facility 112 calculates ratings metrics based on the percentage of an audience that views a broadcast during an average minute of the broadcast. In some examples, the central facility 112 calculates reach metrics based on a number of audience members that were exposed to at least a specified interval (e.g., one minute, six minutes, etc.) of a broadcast. In some examples, the central facility 112 calculates ratings, reach, and/or other metrics based on panelist data, and then utilizes scaling techniques to determine these metrics for the overall audience (e.g., the total possible viewing audience in an area). The central facility 112 of the illustrated example of FIG. 1 computes consistency metrics in accordance with the teachings disclosed herein, with the communication interface 114 accessing the media measurement data 110, the consistency analyzer 116 calculating an example consistency metric 118, and the programming engine 120 taking programming actions based upon the consistency metric 118.

The central facility 112 of the illustrated example of FIG. 1 includes the communication interface 114, the consistency analyzer 116, and the programming engine 120.

The communication interface 114 of the illustrated example of FIG. 1 facilitates communication of the media measurement data 110 from the network 108 to the consistency analyzer 116. The communication interface 114 may include network communication technology such as a local area network (LAN), a serial connection, a Bluetooth connection, a USB connection, and/or any other data communication equipment or protocols. In some examples, the communication interface 114 enables the consistency analyzer 116 to access information from other components at the central facility 112 and/or other information available to the AME.

The consistency analyzer 116 of the illustrated example of FIG. 1 calculates consistency metrics for one or more broadcasts based on the media measurement data 110. For example, the consistency analyzer 116 can calculate a consistency metric for a program to indicate the holding power of a program (e.g., the consistency of the audience size throughout the duration of the program). The consistency analyzer 116 of the illustrated example of FIG. 1 communicates consistency metrics to the programming engine 120. In some examples, the consistency analyzer 116 may communicate consistency metrics to one or more other entities, such as advertisers, broadcasters, content creators, producers, and/or any other entities. In some examples, the consistency analyzer 116 can evaluate changes in consistency metrics for specific programs across time on single platform (e.g., broad-cast television, video-on-demand (VOD) television, radio, digital, etc.). In some examples, the consistency metric 118 may be combined at the central facility 112 with one or more other metrics (e.g., ratings, reach, etc.) to provide an overall exposure metric or characterization of a broadcast. Further detail of the structure and operation of the consistency analyzer 116 is described and illustrated in connection with FIGS. 2 and 3.

The example programming engine 120 of the illustrated example of FIG. 1 takes actions such as adjusting advertising schedules, adjusting programing schedules, and/or other steps in response to accessing the consistency metric 118 calculated by the consistency analyzer 116. In some examples, in response to accessing a consistency metric for a first program, the programming engine 120 can decide to place one or more advertisements during a subsequent broadcast of the first program based on the consistency metric. For example, the programming engine 120 may select an advertisement for placement based on a desired audience exposure quantity provided by an advertiser and based on the consistency metric 118 for a specific program. In some examples, the programming engine 120 can make recommendations to content providers, advertisers, and/or broadcasters about programming based on the consistency metric 118.

In some examples, the programming engine 120 can identify fatigue (e.g., drop-off in consistency metrics over time, etc.) in a reoccurring program. In some examples, the programming engine 120 can evaluate how programming consumption in different parts of the day (e.g., primetime, daytime, late night, etc.) impacts propensity of programs to hold onto their audience. In some such examples, the programming engine 120 can adjust a programming schedule based on an identification of a program with relatively high fatigue. In some examples, the programming engine 120 can evaluate changes in consistency of programs across various delivery platforms (e.g., broadcast television, VOD television, digital, online, etc.). In some examples, the programming engine 120 can change the placement of one or more advertisements in response to determining this propensity. In some examples, the programming engine 120 is a component of the consistency analyzer 116. In other examples, the programming engine 102 can be implemented by any other suitable means.

In operation, the media monitoring devices 104*a*, 104*b* and/or the media devices 106*a*, 106*b* communicate the media measurement data 110 indicating the media content, which was presented to the respective panelists 102*a*, 102*b*, 102*c* via the network 108. The communication interface 114 of the central facility 112 accesses the media measurement data 110 and communicates it to the consistency analyzer 116, which analyzes the media measurement data 110 and calculates the consistency metric 118. The consistency analyzer 116 communicates the consistency metric 118 to the programming engine 120, which takes actions (e.g., adjusting an advertising schedule, adjusting a media content schedule, etc.) in response to the consistency metric 118.

Figure 2:
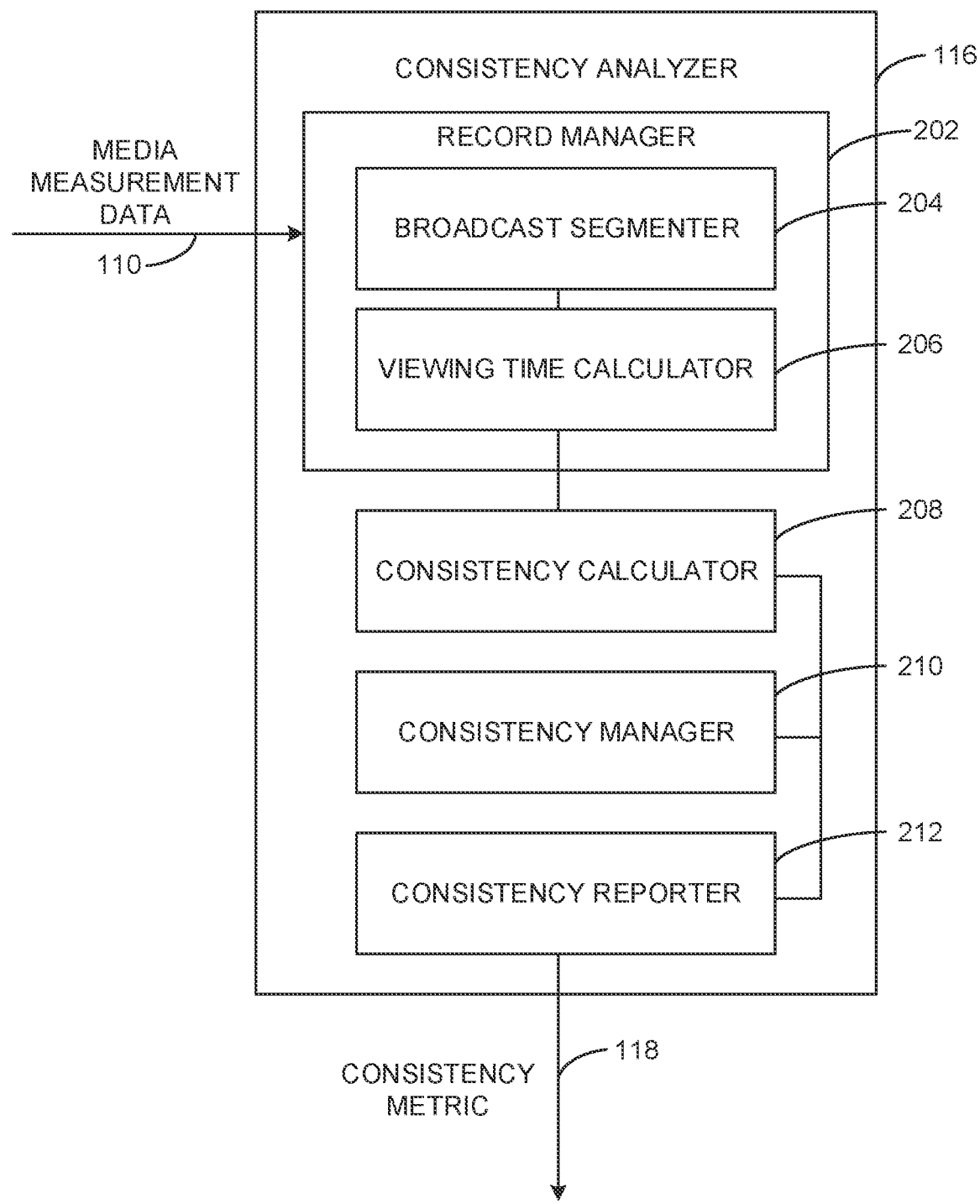
FIG. 2 is a block diagram of an example consistency analyzer of the central facility of FIG. 1.

FIG. 2 is a block diagram of the example consistency analyzer 116 of the central facility 112 of FIG. 1. The central facility 112 includes an example record manager 202, an example broadcast segmenter 204, an example viewing time calculator 206, an example consistency calculator 208, an example consistency manager 210, and an example consistency reporter 212.

The record manager 202 of the illustrated example of FIG. 2 accesses the media measurement data 110 and processes media measurement records from the media monitoring devices 104*a*, 104*b* and/or the media devices 106*a*, 106*b*. In some examples, the record manager 202 receives as an input the media measurement data 110 in a raw (e.g., unprocessed) format and processes the media measurement data 110 to determine quantities of intervals of programs to which a panelist was exposed. In some such examples, the record manager 202 communicates the quantities of intervals and/or other statistics based on the media measurement data 110 to the consistency calculator 208. In some examples, the media measurement data 110 includes statistics and/or summary data, and the record manager 202 communicates the statistics and/or summary data to the consistency calculator 208. The record manager 202 of the illustrated example of FIG. 2 includes the broadcast segmenter 204 and the viewing time calculator 206.

The broadcast segmenter 204 of the illustrated example of FIG. 2 analyzes the media measurement data 110 to determine intervals during which a panelist was exposed to a broadcast program. In some examples, the broadcast segmenter 204 is configured with an interval time, corresponding to a size of interval to utilize to divide a total broadcast program into one or more intervals. For example, if the interval time is set to one minute, a portion of the media measurement data 110 corresponding to a broadcast program of interest is divided into one-minute intervals. In such an example, if the broadcast duration is sixty minutes, the broadcast program is divided into sixty, one-minute intervals. In some such examples, for different ones of the determined intervals, the broadcast segmenter 204 determines, based on the media measurement data 110, whether the panelist was exposed to the respective different ones of the intervals. In some examples, the broadcast segmenter 204 analyzes viewing intervals for any broadcast program for which any duration of exposure is represented in the media measurement data 110. In some examples, a minimum viewing threshold is utilized to determine which broadcasts program are analyzed. For example, if the minimum viewing threshold is set to three minutes, only broadcast programs which the panelist was exposed to for more than three minutes are divided and analyzed by the broadcast segmenter 204.

The viewing time calculator 206 of the illustrated example of FIG. 2 determines a quantity of a broadcast program to which a panelist was exposed. In some examples, the viewing time calculator 206 determines a duration of the broadcast program to which the panelist was exposed. In some examples, the viewing time calculator 206 determines a quantity of intervals of the broadcast program to which the panelist was exposed. In some examples, the viewing time calculator 206 determines quantities of exposure for any broadcasts represented in the media measurement data 110. In some examples, the viewing time calculator 206 determines the quantity of the broadcast program based on the interval size configured in the broadcast segmenter 204. For example, if the interval size is set to five minutes, the viewing time calculator can determine the quantity of a broadcast program to which the panelist was exposed in increments of the interval size (e.g., increments of five minutes).

The consistency calculator 208 of the illustrated example of FIG. 2 calculates a consistency metric for a broadcast represented in the media measurement data 110. In some examples, the consistency calculator 208 calculates the consistency metric for a broadcast program based on a plurality of quantities of panelists which were exposed to at least specified portions (e.g., a specified quantity of intervals, a specified duration, etc.) of the broadcast program.

The consistency calculator 208 of the illustrated example of FIG. 2 calculates a number of panelists that were exposed to a specified portion of a broadcast program. In some examples, the portion is an overall quantity of intervals and/or duration, rather than a specific time-bound portion (e.g., the portion may be ten minutes of the broadcast, regardless of which ten minutes were viewed). In some such examples, the portions (e.g., sets of intervals) which were exposed to panelists may be non-contiguous relative to each other. For example, a first panelist may watch minutes five to ten and minutes twenty five to forty five of a broadcast (e.g., twenty five total minutes) and a second panelist may watch minutes forty to fifty (e.g., ten total minutes) of the same broadcast. In such an example, the consistency calculator 208 may determine both the first panelist and the second panelist count towards a number of panelists who watched at least ten minutes of the broadcast program, despite the fact that they watched different sets of intervals.

As another example, when calculating the consistency metric, the consistency calculator 208 may determine that one thousand panelists were exposed to at least twenty-five percent of a broadcast program, eight hundred panelists were exposed to at least fifty percent of the broadcast program, five hundred panelists were exposed to at least seventy-five percent of the broadcast program, and three hundred panelists were exposed to one-hundred percent of the broadcast program. The consistency calculator 208 of the illustrated example of FIG. 2 computes the consistency metric based on a variation of the quantities of panelists exposed to each investigated quantity (e.g., percentage) of the broadcast program (e.g., 25%, 50%, 75%, etc.).

In some examples, the consistency calculator 208 utilizes a coefficient of variation to determine the consistency metric. The coefficient of variation is determined by dividing the standard deviation of the numbers of viewers across each of the investigated quantities (e.g., percentages) of the broadcast by the mean of the numbers of viewers across each of the investigated quantities (e.g., percentage). In some examples, the consistency calculator 208 can determine the consistency metric via a regression model. In some examples, the consistency calculator 208 can determine the consistency metric via a correlation analysis and/or serial correlation analysis. In some examples, the consistency calculator 208 determines the consistency metric based on a median absolute deviation from the median (MADM), standardized moments, a variance to mean ratio, a Fano factor, relative standard error, and/or any other statistical measures.

In some examples, the consistency calculator 208 calculates consistency metrics for any broadcast represented in the media measurement data 110 and/or any broadcast summary or statistical data communicated to the consistency calculator 208 by the record manager 202. In some examples, the consistency calculator 208 calculates consistency metrics for those broadcast program(s) that satisfy a minimum exposure threshold. For example, if a program has a quantity of exposures (e.g., a quantity of panelists who watched 25%) that does not satisfy the minimum exposure threshold, a consistency metric may not be calculated. For example, the usefulness of a consistency metric may be lessened for very small datasets.

The consistency manager 210 of the illustrated example of FIG. 2 stores, communicates, and/or processes consistency metrics. In some examples, the consistency manager 210 includes a storage location to store consistency metrics associated with broadcasts. In some examples, the consistency manager 210 takes one or more actions in response to receiving a consistency metric from the consistency calculator 208. For example, the consistency manager 210 can communicate with the programming engine 120 of FIG. 1 to cause an adjustment to a programming schedule in response to a consistency metric (e.g., changing a timeslot of a program based on a consistency metric, removing a program based on a consistency metric, etc.). In some examples, the consistency manager 210 can communicate with the programming engine 120 to cause an advertising schedule to be adjusted based on one or more consistency metric(s). For example, in an implementation with a dynamic advertising system where ads can be priced to be placed with shows based on specified exposure characteristics (e.g., a consistency metric), the consistency manager 210 can cause adjustments in advertisement placements to match advertisements with programs that have had broadcasts matching one or more consistency metric thresholds.

In some examples, the consistency manager 210 utilizes consistency metrics associated with a program (e.g., a first consistency metric for a first episode of a program, a second consistency metric for a second episode of a program, etc.) to calculate a loyalty metric for the program. In some such examples, a loyalty metric can be communicated to a content producer, advertising entity, producer, network, and/or other entity to help convey how loyal an audience is to a program.

The example consistency reporter 212 of the illustrated example of FIG. 2 communicates an example consistency metric 118 to the programming engine 120 of FIG. 1 and/or other entities (e.g., content producers, networks, advertising agencies, etc.). In some examples, the consistency reporter 212 communicates loyalty metrics, programming schedule adjustments, and/or advertising schedule adjustments to the programming engine 120 in addition to or alternatively to the consistency metric 118. In some examples, the consistency reporter 212 communicates the consistency metric 118 to one or more other entities at the central facility 112 of FIG. 1.

While example manners of implementing the central facility 112 and the consistency analyzer 116 are illustrated in FIGS. 1-2, one or more of the elements, processes and/or devices illustrated in FIGS. 1-2 may be combined, divided, re-arranged, omitted, eliminated and/or implemented in any other way. Further, the example consistency analyzer 116, the example programming engine 120, the example record manager 202, the example broadcast segmenter 204, the example viewing time calculator 206, the example consistency calculator 208, the example consistency manager 210, the example consistency reporter 212 and/or, more generally, the example central facility 112 of FIGS. 1-2 may be implemented by hardware, software, firmware and/or any combination of hardware, software and/or firmware. Thus, for example, any of the example consistency analyzer 116, the example programming engine 120, the example record manager 202, the example broadcast segmenter 204, the example viewing time calculator 206, the example consistency calculator 208, the example consistency manager 210, the example consistency reporter 212 and/or, more generally, the example central facility 112 of FIGS. 1-2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example consistency analyzer 116, the example programming engine 120, the example record manager 202, the example broadcast segmenter 204, the example viewing time calculator 206, the example consistency calculator 208, the example consistency manager 210, and/or the example consistency reporter 212 is/are hereby expressly defined to include a non-transitory computer readable storage device or storage disk such as a memory, a digital versatile disk (DVD), a compact disk (CD), a Blu-ray disk, etc. including the software and/or firmware. Further still, the example central facility 112 and/or the consistency analyzer 116 may include one or more elements, processes and/or devices in addition to, or instead of, those illustrated in FIGS. 1-2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
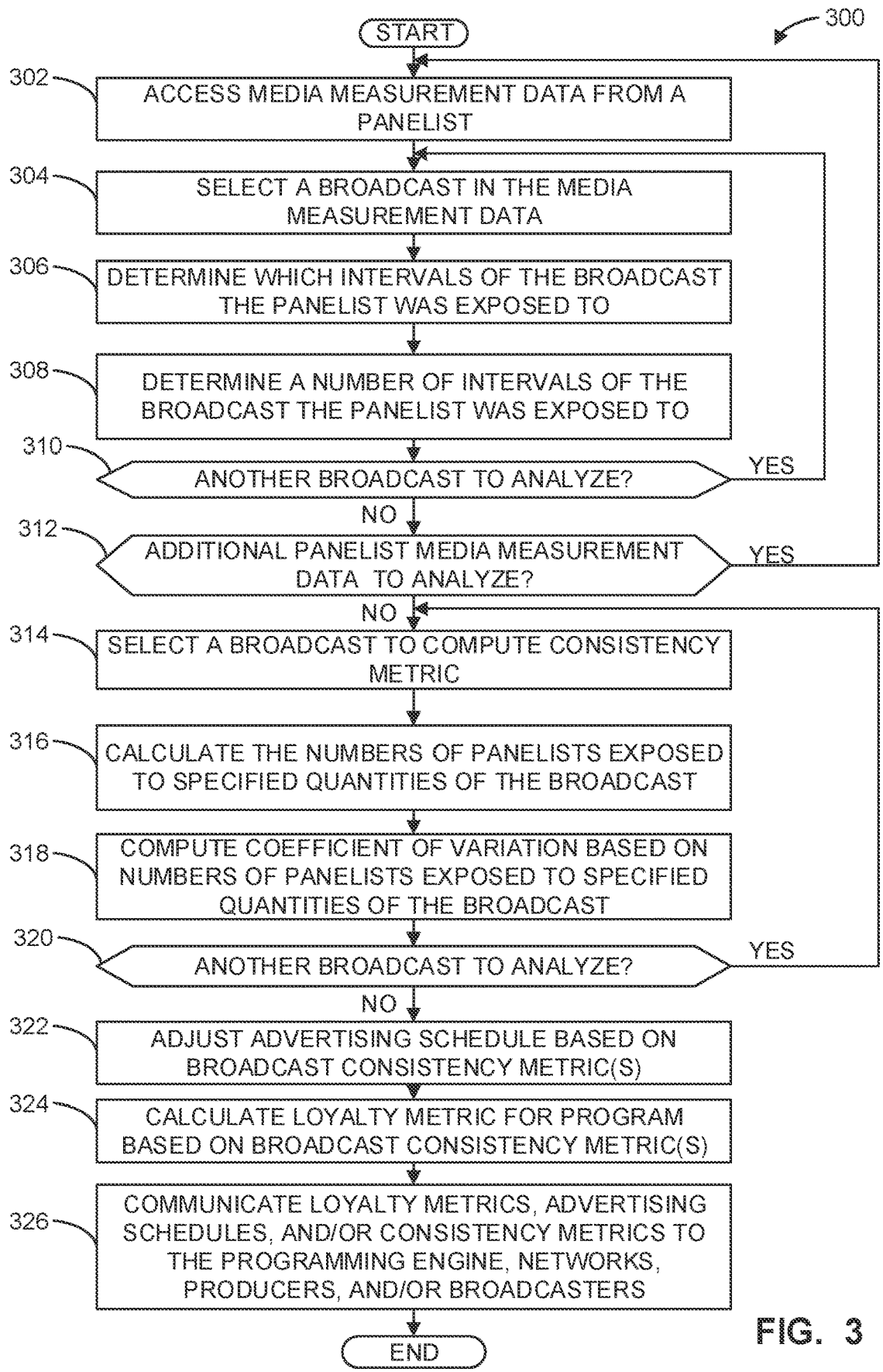
FIG. 3 is a flowchart representative of machine readable instructions which may be executed to implement the consistency analyzer of FIGS. 1 and 2.

A flowchart representative of example hardware logic, machine readable instructions, hardware implemented state machines, and/or any combination thereof for implementing the consistency analyzer 116 of FIG. 2 is shown in FIG. 3. The machine readable instructions may be one or more executable programs or portion(s) of an executable program for execution by a computer processor and/or processor circuitry, such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 3, many other methods of implementing the example consistency analyzer 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of machine readable instructions which may be executed to implement the consistency analyzer 116 of FIGS. 1 and 2. With reference to the preceding figures and associated descriptions, the example machine readable instructions 300 begin at block 302 with the example consistency analyzer 116 accessing media measurement data from a panelist. In some examples, the record manager 202 accesses the media measurement data 110 from the panelist. For example, the record manager 202 may access the media measurement data 110 as communicated by the media monitoring devices 104a, 104b and/or the media devices 106a, 106b to the central facility 112.

At block 304, the example consistency analyzer 116 selects a broadcast program in the media measurement data. In some examples, the broadcast segmenter 204 selects a broadcast program in the media measurement data. In some examples, the broadcast segmenter 204 selects broadcast programs sequentially based on their order of occurrence in the media measurement data 110. In some examples, the broadcast segmenter 204 selects broadcast programs based on whether the exposure duration to the broadcast satisfied a threshold. For example, the broadcast segmenter 204 may select broadcast programs for analysis if they were exposed to the panelist for at least three minutes or some other threshold value.

At block 306, the example consistency analyzer 116 determines which intervals of the broadcast program the panelist was exposed to. In some examples, the broadcast segmenter 204 determines which intervals of the broadcast program the panelist was exposed to. For example, the broadcast segmenter 204 may divide the broadcast program into intervals based on an interval time (e.g., one minute, three minutes, five minutes, etc.) configured for the consistency metric. The broadcast segmenter 204 then analyzes the media measurement data 110 at each of the intervals to determine if the panelist was exposed to the broadcast program during the interval time.

At block 308, the example consistency analyzer 116 determines a number of intervals of the broadcast program that the panelist was exposed to. In some examples, the viewing time calculator 206 determines a number of intervals of the broadcast program that the panelist was exposed to. In some examples, the viewing time calculator 206 determines a duration of the broadcast program that the panelist was exposed to.

At block 310, the example consistency analyzer 116 determines whether there is another broadcast program to analyze. In some examples, the record manager 202 determines whether there is another broadcast program to analyze. For example, the record manager 202 and/or the broadcast segmenter 204 can determine if there are additional broadcast programs represented in the media measurement data 110. In response to there being another broadcast program to analyze, processing transfers to block 304. Conversely, in response to there not being another broadcast program to analyze, processing transfers to block 312.

At block 312, the example consistency analyzer 116 determines whether there is an additional panelist's media measurement data to analyze. In some examples, the record manager 202 determines whether there is additional media measurement data from a panelist that has not yet been analyzed represented in the media measurement data 110. In response to there being additional panelist media measurement data to analyze, processing transfers to block 302. Conversely, in response to there not being additional panelist media measurement data to analyze, processing transfers to block 314.

At block 314, the example consistency analyzer 116 selects a broadcast program for which to compute a consistency metric. In some examples, the consistency calculator 208 selects a broadcast program for which to compute a consistency metric based on the broadcast programs represented in the media measurement data 110 and/or the statistics and/or summary data calculated by the viewing time calculator 206.

At block 316, the example consistency analyzer 116 calculates the number of panelists exposed to specified quantities of the broadcast program. In some examples, the consistency calculator 208 calculates the number of panelists exposed to specified quantities of the broadcast program. In some examples, the specified quantities are portions of the broadcast program (e.g., 25% of the broadcast, 50% of the broadcast, 75% of the broadcast, etc.). In some examples, the consistency calculator 208 calculates the number of panelists exposed to the specified quantities based on overall quantities of intervals and/or durations, regardless of whether these intervals are non-contiguous. In some examples, these intervals may be non-contiguous even for a single panelist (e.g., the panelist watched a few minutes at the beginning of a broadcast program, a few minutes in the middle of a broadcast program, and a few minutes at the end). In some examples, these intervals may be non-contiguous between panelists (e.g., different panelists watched different minutes which added up to a same specified quantity of the broadcast program).

At block 318, the example consistency analyzer 116 computes a coefficient of variation based on the number of panelists exposed to specified quantities of the broadcast program. In some examples, the consistency calculator 208 computes the coefficient of variation based on numbers of panelists exposed to the specified quantities of the broadcast program. To compute the coefficient of variation, the consistency calculator 208 divides the standard deviation of the numbers of panelists exposed to the specified quantities by the mean of the numbers of panelists exposed to the specified quantities. As an example, the quantities can be specified percentages of the broadcast, such as 25%, 50%, 75%, and 100%. For example, the consistency analyzer 116 can determine that 100 panelists watched 25% of the broadcast, 93 panelists watched 50% of the broadcast, 70 panelists watched 75% of the broadcast, and 44 panelists watched 100% of the broadcast. In such an example, the standard deviation (25.32) of these numbers of panelists (100, 93, 70, 44) would be divided by the mean (76.75) of these numbers, resulting in a coefficient of variation of 0.33. In the preceding example, the mean, μ, is calculated as:

$$\mu = \frac{1}{4}(100+93+70+44) = 76.75.$$

In the preceding example, the standard deviation, σ, is calculated as:

$$\sigma = \sqrt{\frac{1}{4-1}\left[(100-\mu)^2 + (93-\mu)^2 + (70-\mu)^2 + (44-\mu)^2\right]} = 25.32.$$

In some examples, the consistency calculator 208 computes an additional or alternative statistic based on the numbers of panelists exposed to the specified quantities to quantify the consistency of the audience exposure.

At block 320, the example consistency analyzer 116 determines whether there is another broadcast program to analyze. In some examples, the consistency calculator 208 determines whether there is another broadcast program to analyze based on whether all the broadcast programs represented in the media measurement data 110 have been analyzed. In some examples, the consistency calculator 208 determines whether there is another broadcast program to analyze by comparing any unanalyzed broadcast programs (e.g., broadcasts for which a consistency metric has not been calculated) with a minimum duration threshold that corresponds to a minimum audience size for a broadcast program in order to have a consistency metric calculated for the broadcast. In response to there being another broadcast program to analyze, processing transfers to block 314. Conversely, in response to there not being another broadcast program to analyze, processing transfers to block 322.

At block 322, the example consistency analyzer 116 adjusts an advertising schedule based on one or more broadcast consistency metric(s). In some examples, the consistency manager 210 causes an adjustment to an advertising schedule to be made in response to one or more consistency metric(s) calculated by the consistency calculator 208. In some examples, the consistency manager 210 communicates with the programming engine 120 to cause an adjustment to the advertising schedule in response to the one or more consistency metric(s).

At block 324, the example consistency analyzer 116 calculates a loyalty metric for a program based on broadcast consistency metric(s). In some examples, the consistency manager 210 calculates a loyalty metric for a program based on broadcast consistency metric(s). For example, the consistency manager 210 may calculate a loyalty metric based on a plurality of consistency metric(s) corresponding to different episodes of a program.

At block 326, the example consistency analyzer 116 communicates loyalty metrics, advertising schedules, and/or consistency metrics to the programming engine 120, networks, producers, and/or broadcasters. In some examples, the consistency reporter 212 communicates the consistency metric 118 and/or loyalty metrics or advertising schedules to the programming engine 120, networks, producers, and/or broadcasters.

Figure 4A:
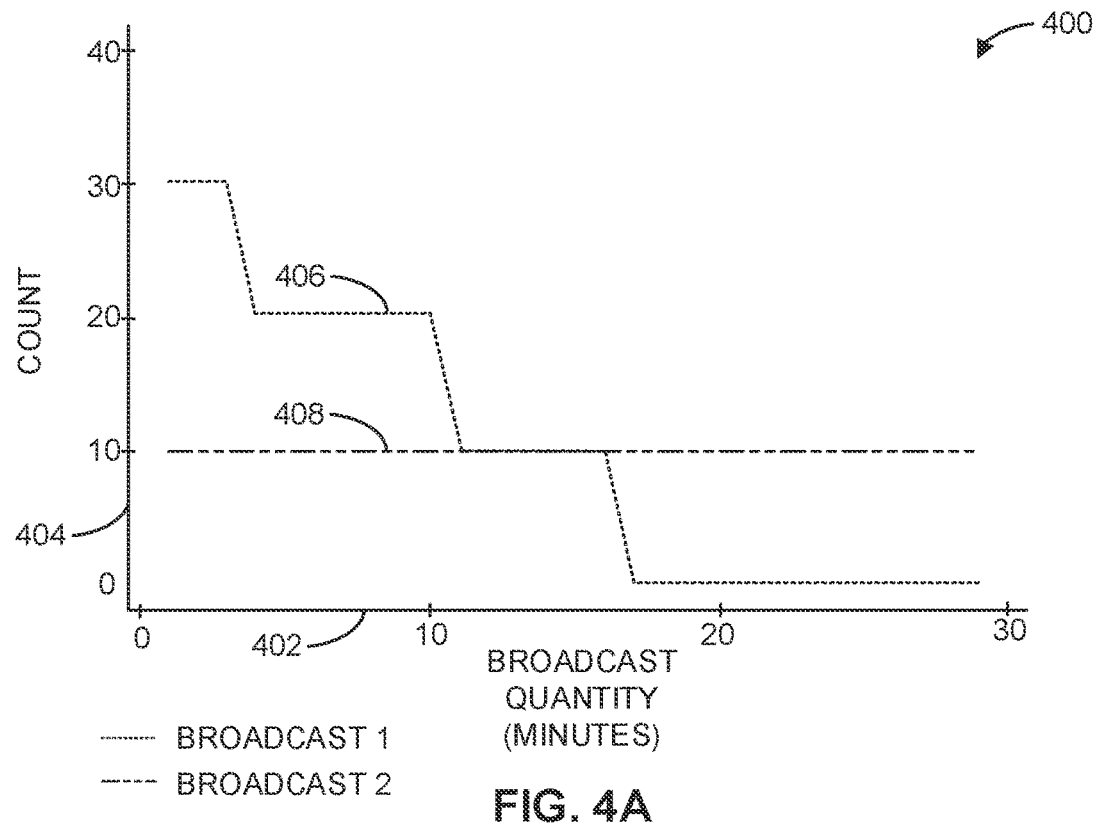
FIG. 4A is a first plot illustrating an example count of audience members exposed to durations of an example first broadcast and an example second broadcast.

FIG. 4A is an example first plot 400 illustrating a count of panelists exposed to durations of an example first broadcast program and an example second broadcast program. The example first plot includes an example broadcast quantity axis 402 and an example count axis 404. The broadcast quantity axis 402 represents quantities of intervals of a broadcast program. In the illustrated example, the broadcast quantity is defined in terms of minutes, though any unit of time may be used to define intervals and/or quantities of a broadcast program. In the first plot 400, the broadcast quantity axis 402 does not refer to sequential or specific intervals of a broadcast program, but rather an overall quantity. The count axis 404 provides information on the number of panelists that were exposed to at least the quantity of the broadcast program that is represented on the broadcast quantity axis 402.

The first plot 400 includes an example first broadcast series 406 corresponding to the first broadcast program and an example second broadcast series 408 corresponding to the second broadcast program. As illustrated, the first broadcast series 406 includes thirty panelists who were exposed to a brief broadcast quantity of at least few minutes of the first broadcast program, with twenty panelists exposed to as much as ten minutes of the first broadcast program, ten panelists exposed to as much as sixteen minutes of the first broadcast program, and no panelists who were exposed to more than sixteen minutes of the first broadcast program. The second broadcast series 408 illustrates a consistent count of panelists, with ten panelists viewing the entirety of the second broadcast program.

As illustrated in the first plot of FIG. 4A, if exposure were quantified in terms of exposure on the average minute of the represented broadcasts (as is done conventionally with ratings), each broadcast would have the same rating (ten viewers during an average minute). However, such an exposure characteristic fails to capture the significantly different characteristics of these broadcasts. In the first broadcast program associated with the first broadcast series 406, there is a significant shift in exposure throughout the first broadcast program, while the second broadcast program associated with the second broadcast series 408 has no change in exposure throughout the second broadcast program. An advertiser, content creator, producer, and/or other media entity may thus be interested in utilizing the consistency metric disclosed herein to capture a more nuanced view into how a particular broadcast program is holding its audience.

Figure 4B:
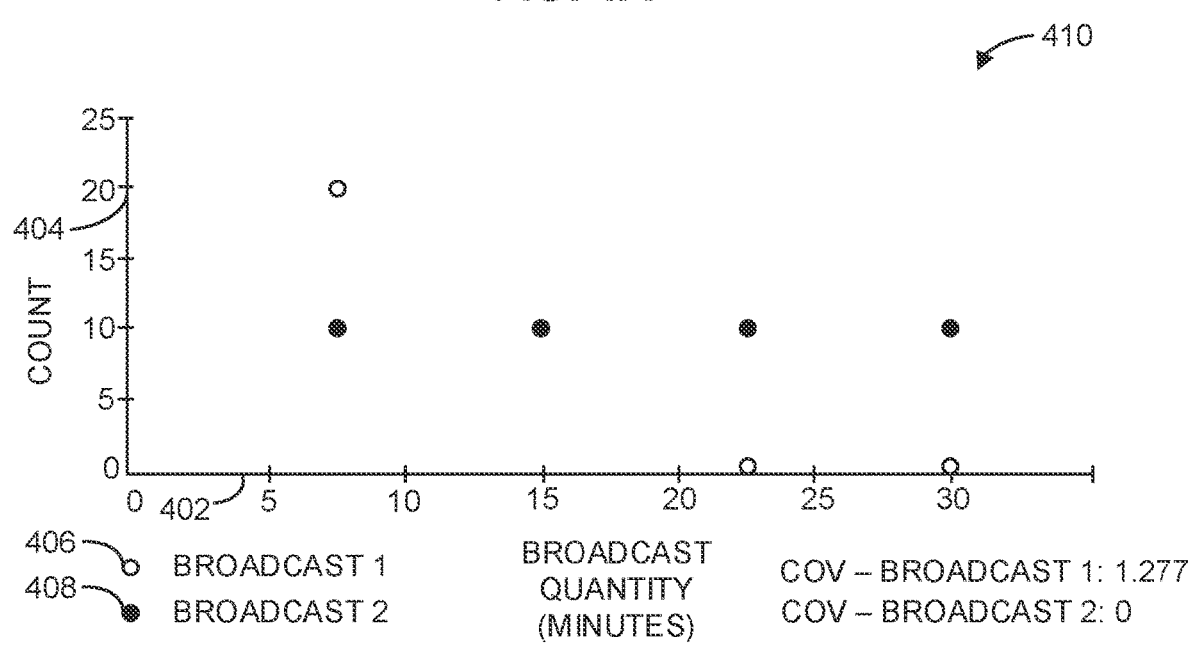
FIG. 4B is a second plot illustrating example audience member exposure to quantities of intervals of the first broadcast and the second broadcast of FIG. 4A.

FIG. 4B is an example second plot 410 illustrating audience member exposure to quantities of intervals of the first broadcast program and the second broadcast program of FIG. 4A. The second plot 410 includes the broadcast quantity axis 402 and the count axis 404. The example second plot 410 corresponds to the media measurement data illustrated in FIG. 4A. Additionally, the second plot 410 includes the first broadcast series 406 and the second broadcast series 408. However, the second plot 410 illustrates the numbers of panelists exposed to specified quantities of the first broadcast program and the second broadcast program, rather than continuous data at all broadcast quantities.

In the illustrated example of FIGS. 4A and 4B, the first broadcast program and the second broadcast program each have a duration of thirty minutes. In the illustrated example of FIG. 4B, the specified quantities utilized to calculate the consistency metric are quartiles of the broadcast program (e.g., 25%, 50%, 75%, 100%). As illustrated, the first broadcast series 406 has a count of twenty panelists at the first quartile, followed by a count of ten panelists at the second quartile (not visible in the second plot 410 since it overlaps with the first broadcast series 406), and counts of zero panelists at the third and fourth quartiles. The second broadcast series 408 has a consistent count of ten panelists at each quartile.

In the illustrated example of FIG. 4B, a consistency metric is calculated for each of the broadcasts based on the numbers of panelists exposed to each of the specified quantities. In the illustrated example, the consistency metric is calculated using the coefficient of variation, resulting in a value of 1.277 for the first broadcast and 0 for the second broadcast. To calculate the coefficient of variation for the first broadcast, the mean of the numbers of viewers across the viewing quantities is calculated (e.g., by calculating the mean of 20, 10, 0, and 0), which in this case is 7.5. Additionally, the standard deviation of the numbers of viewers across the viewing quantities is calculated (e.g., by calculating the standard deviation of 20, 10, 0 and 0), which in this case is 9.57. The standard deviation is then divided by the mean to calculate the coefficient of variation of 1.277 for the first broadcast. Similarly, to calculate the coefficient of variation for the second broadcast, the mean of the numbers of viewers across the viewing quantities is calculated (by calculating the mean of 10, 10, 10, and 10), which in this case is 10. Additionally, the standard deviation of the numbers of viewers across the viewing quantities is calculated (e.g., by calculating the standard deviation of 10, 10, 10, and 10), which in this case is 0. The standard deviation is then divided by the mean to calculate the coefficient of variation of 0 for the second broadcast. The consistency metric having a low value indicates a small amount of variance relative to the mean exposure value, and thus 0 is the smallest amount of variance that can be achieved. The first broadcast has a significantly higher variance, due to the substantial decrease in exposure at larger broadcast quantities (e.g., 50%, 75%, etc.). Thus, the consistency metrics in this case indicate that the second broadcast had a greater holding power than the first broadcast.

FIG. 5A is an example third plot 500 illustrating audience member exposure to quantities of intervals of an example third broadcast program. The example third plot 500 includes an example quartiles axis 502, indicating specified quantities, in this case quartiles, of the third broadcast program. The quartiles axis 502 includes four indicated quartiles, representing 25%, 50%, 75% and 100% of the overall broadcast duration of the third program. The third plot 500 includes an example count axis 504, indicating a number of panelists who were exposed to at least the specified interval indicated on the quartiles axis 502.

The example third plot 500 illustrates an example third series 506, which depicts the number of panelists who viewed at least the specified quantity of the third broadcast program. As illustrated, 100 panelists viewed at least 25% of the third broadcast program, 85 panelists viewed at least 50% of the third broadcast program, 71 panelists viewed at least 75% of the third broadcast program, and 33 panelists viewed 100% of the third broadcast program. When utilizing the consistency analyzer 116 of FIGS. 1 and 2 to calculate the consistency metric for the third broadcast based on the coefficient of variation, the third broadcast has a consistency metric of 0.638. In the illustrated example of FIG. 5A, the consistency analyzer 116 calculates the standard deviation of the numbers of viewers across the quantities of the third broadcast program (e.g., 25% viewed, 50% viewed, 75% viewed, 100% viewed). The numbers of viewers of the third broadcast program at the quantities of 25%, 50%, 75%, and 100% are illustrated in FIG. 5C. To calculate the coefficient of variation for this program, the standard deviation of the numbers of viewers (2872987, 2019996, 1293911, 400262) is divided by the mean of the numbers of viewers. The standard deviation in this example is 1052171.95, and the mean is 1646789, resulting in a coefficient of variation of 0.638.

FIG. 5B is an example fourth plot 508 illustrating audience member exposure to quantities of intervals of an example fourth broadcast program. The example fourth plot 508 includes the example quartiles axis 502 and the example count axis 504. The fourth plot 508 illustrates an example fourth series 510, which depicts the number of panelists who viewed at least the specified quantity of the fourth broadcast program. As illustrated, 100 panelists viewed at least 25% of the fourth broadcast program, 70 panelists viewed at least 50% of the fourth broadcast program, 45 panelists viewed at least 75% of the fourth broadcast program, and 14 panelists viewed 100% of the fourth broadcast program. When utilizing the consistency analyzer 116 of FIGS. 1 and 2 to calculate the consistency metric for the fourth broadcast program based on the coefficient of variation, the fourth broadcast has a consistency metric of 0.399. In the illustrated example of FIG. 5B, the consistency analyzer 116 calculates the standard deviation of the numbers of viewers across the quantities of the fourth broadcast program (e.g., 25% viewed, 50% viewed, 75% viewed, 100% viewed). The numbers of viewers of the fourth broadcast program at the quantities of 25%, 50%, 75%, and 100% are illustrated in FIG. 5C. To calculate the coefficient of variation for this program, the standard deviation of the numbers of viewers (7869855, 6730668, 5554773, 2586279) is divided by the mean of the numbers of viewers. The standard deviation in this example is 2272006.69, and the mean is 5685393.75, resulting in a coefficient of variation of 0.399.

FIG. 5C is an example table 512 including example audience measurement metrics including example consistency metrics calculated based on techniques disclosed herein. The example table 512 includes an example broadcast rank column 514, an example reach percent column 516, example quartile count columns 518, and an example consistency metric column 520. The table 512 includes data for four broadcasts program, including the third broadcast program represented in FIG. 5A (labeled as "Broadcast #3" in the table 512) and the fourth broadcast program represented in FIG. 5B (labeled as "Broadcast #4" in the table 512).

As illustrated in the table 512, each of the four broadcasts represented in the table have the same value of 4.7 for their reach percent. In some examples, these values may be slightly different at a higher degree of precision (e.g., 4.79, 4.75, 4.73, 4.71, etc.), thereby enabling the broadcasts to be ranked, as illustrated in the example broadcast rank column 514. However, with so many broadcasts having similar reach or rating numbers due to the increased proliferation of media content and/or platforms, it has become increasingly difficult to tell which broadcast represents a better exposure opportunity (e.g., for an advertiser, for a content creator, etc.). However, by looking at the consistency metrics of the consistency metric column 520, as calculated using techniques described herein, there is a clear difference in the holding power of each broadcast.

For the consistency metric values included in table 512, the values in the quartile count columns 518 are utilized to calculate the consistency metric. In the illustrated example, the consistency metric is calculated as the coefficient of variation of the values in the quartile count columns 518. When looking at the consistency metric column 520, it is clear that the fourth broadcast program, despite having the same reach percent as the other broadcast programs, actually has the lowest consistency metric, indicating the lowest variation among viewing durations and consequently the most holding power of the program. Thus, if an entity is interested in comparing the holding power of broadcast programs, they could sort the broadcast statistics by the consistency metric column 520 to determine a ranking based on consistency. In such an example, the fourth broadcast program would be the top ranked broadcast program (the broadcast program with the lowest coefficient of variation), followed by the first broadcast program, the second broadcast program, and finally the third broadcast program.

Figure 6:
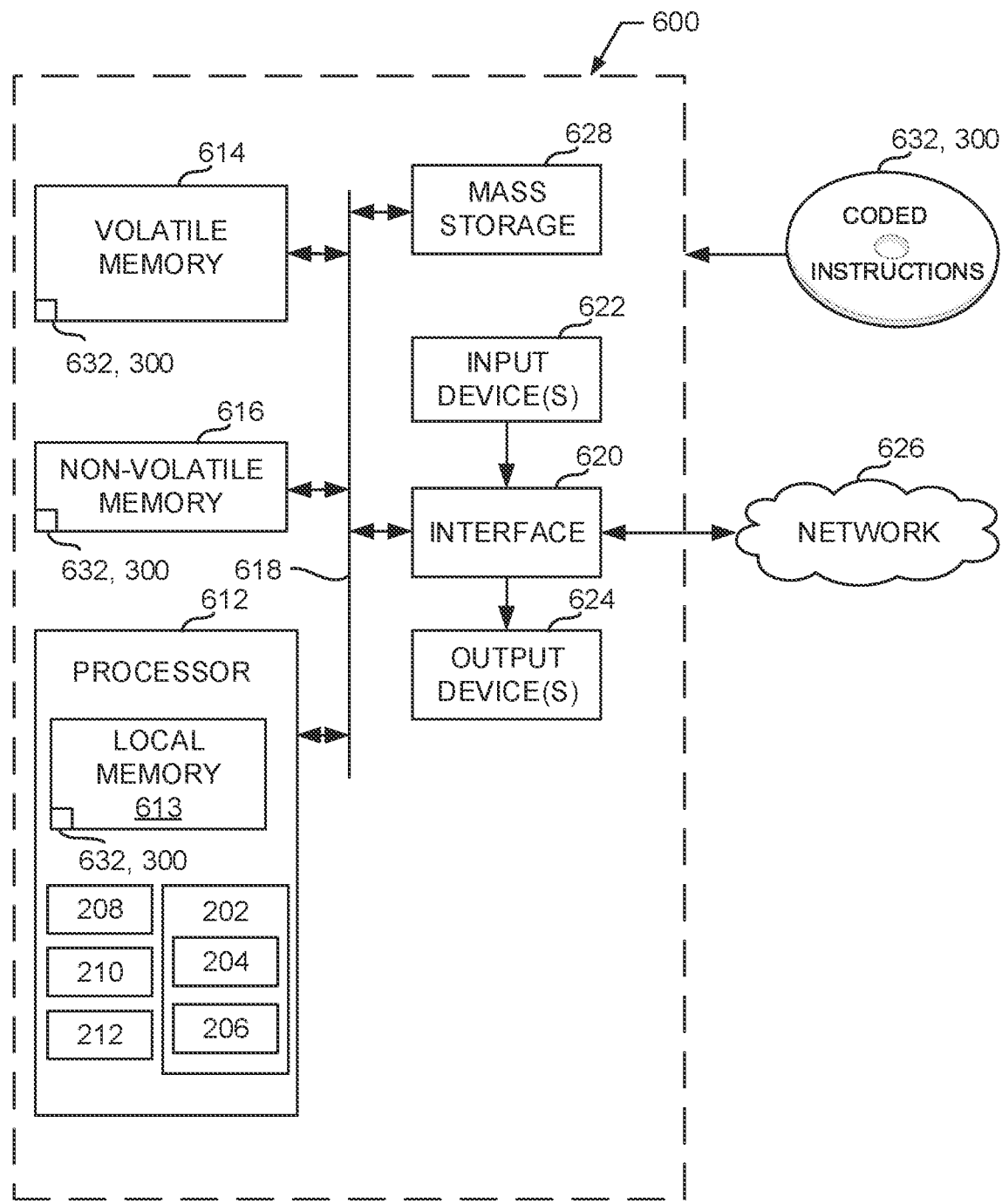
FIG. 6 is a block diagram of an example processing platform structured to execute the instructions of FIG. 3 to implement the example consistency analyzer of FIGS. 1 and/or 2.

FIG. 6 is a block diagram of an example processor platform 600 structured to execute the instructions of FIG. 3 to implement the consistency analyzer 116 of FIGS. 1-2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example record manager 202, the example broadcast segmenter 204, the example viewing time calculator 206, the example consistency calculator 208, the example consistency manager 210, and the example consistency reporter 212.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, a PCI express interface, a Zigbee interface, and/or any other suitable interface standard.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 300, 632 of FIG. 3 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that determine a consistency metric capable of characterizing the holding power of a broadcast. Example methods, apparatus and articles of manufacture disclosed herein overcome the challenges of traditional media rating and reach metrics by analyzing the consistency of a number of panelists who watched a broadcast in terms of the quantity of the broadcast they were exposed to. Example techniques disclosed herein enable dynamic advertising, versatile programming changes, and/or calculation of loyalty metrics for programs, facilitating the intelligent adjustment of media content and enhanced understanding of media consumption trends. Example methods, apparatus, and articles of manufacture disclosed herein synthesize and analysis media measurement data communicated via a plurality of media measurement and/or media devices and utilize this media measurement data to generate consistency metrics that cause adjustments to subsequent media presentations. The disclosed methods, apparatus and articles of manufacture improve the efficiency of using a computing device by increasing the efficiency with which a content delivery system can make intelligent adjustments to media content. The disclosed methods, apparatus and articles of manufacture are accordingly directed to one or more improvement(s) in the functioning of a computer.

Example methods, apparatus, systems, and articles of manufacture to estimate media audience consistency are disclosed herein. Further examples and combinations thereof include the following:

Example 1 includes an apparatus comprising a record manager to access media measurement data communicated via a network from a plurality of media monitors, the media measurement data corresponding to a plurality of panelists, and a consistency calculator to determine a first number of the panelists exposed to a first quantity of a first broadcast, determine a second number of the panelists exposed to a second quantity of the first broadcast, and output a consistency metric associated with the first broadcast, the consistency metric based on a variation among at least the first number and the second number.

Example 2 includes the apparatus of example 1, wherein the first quantity corresponds to a first number of intervals of the first broadcast and the second quantity corresponds to a second number of intervals of the first broadcast.

Example 3 includes the apparatus of example 2, wherein at least some intervals in the first number of intervals are non-contiguous for a first one of the panelists in the first number of the panelists.

Example 4 includes the apparatus of example 2, wherein the first number of the panelists includes a first panelist and a second panelist, wherein the record manager is to determine a first set of intervals of the first broadcast to which the first panelist was exposed, a first sum of the first set of intervals being at least as large as the first quantity, and determine a second set of intervals of the first broadcast to which the second panelist was exposed, a second sum of the second set of intervals being at least as large as the first quantity, the second set of intervals of the first broadcast different from the first set of intervals of the first broadcast.

Example 5 includes the apparatus of example 1, wherein the consistency calculator is to calculate the consistency metric by dividing (i) an average of at least the first number and the second number by (ii) the variation of the at least the first number and the second number.

Example 6 includes the apparatus of example 5, wherein the consistency metric is a coefficient of variation, and the consistency calculator is to calculate the variation to be a standard deviation of at least the first number and the second number.

Example 7 includes the apparatus of example 1, wherein the consistency metric is a first consistency metric, the variation is a first variation, and the consistency calculator is to determine a third number of the panelists exposed to a third quantity of a second broadcast represented in the media measurement data, determine a fourth number of the panelists exposed to a fourth quantity of the second broadcast, and output a second consistency metric associated with the second broadcast, the second consistency metric based on a second variation of at least the third number and the fourth number.

Example 8 includes the apparatus of example 7, further including a consistency manager to adjust an advertising schedule based on the first consistency metric and the second consistency metric.

Example 9 includes the apparatus of example 7, wherein the first broadcast corresponds to a first episode of a program, the second broadcast corresponds to a second episode of the program, and the apparatus further includes a consistency manager to calculate a loyalty metric based on the first consistency metric and the second consistency metric.

Example 10 includes a non-transitory computer readable storage medium comprising instructions which, when executed, cause one or more processors to at least access media measurement data communicated via a network from a plurality of media monitors, the media measurement data corresponding to a plurality of panelists, determine a first number of the panelists exposed to a first quantity of a first broadcast, determine a second number of the panelists exposed to a second quantity of the first broadcast, and output a consistency metric associated with the first broadcast, the consistency metric based on a variation of at least the first number and the second number.

Example 11 includes the computer readable storage medium of example 10, wherein the first quantity corresponds to a first number of intervals of the first broadcast and the second quantity corresponds to a second number of intervals of the first broadcast.

Example 12 includes the computer readable storage medium of example 11, wherein at least some intervals in the first number of intervals are non-contiguous for a first one of the panelists in the first number of the panelists.

Example 13 includes the computer readable storage medium of example 11, wherein the first number of the panelists includes a first panelist and a second panelist, wherein the instructions, when executed, cause the one or more processors to determine a first set of intervals of the first broadcast to which the first panelist was exposed, a first sum of the first set of intervals being at least as large as the first quantity, and determine a second set of intervals of the first broadcast to which the second panelist was exposed, a second sum of the second set of intervals being at least as large as the first quantity, the second set of intervals of the first broadcast different from the first set of intervals of the first broadcast.

Example 14 includes the computer readable storage medium of example 10, wherein the instructions, when executed, cause the one or more processors to calculate the consistency metric by dividing (i) an average of at least the first number and the second number by (ii) the variation of the at least the first number and the second number.

Example 15 includes the computer readable storage medium of example 10, wherein the consistency metric is a first consistency metric, the variation is a first variation, wherein the instructions cause the one or more processors to determine a third number of the panelists exposed to a third quantity of a second broadcast represented in the media measurement data, determine a fourth number of the panelists exposed to a fourth quantity of the second broadcast, and output a second consistency metric associated with the second broadcast, the second consistency metric based on a second variation of at least the third number and the fourth number.

Example 16 includes the computer readable storage medium of example 15, wherein the instructions, when executed, cause the one or more processors to adjust an advertising schedule based on the first consistency metric and the second consistency metric.

Example 17 includes the computer readable storage medium of example 15, wherein the first broadcast corresponds to a first episode of a program, the second broadcast corresponds to a second episode of the program, wherein the instructions, when executed, cause the one or more processors to calculate a loyalty metric based on the first consistency metric and the second consistency metric.

Example 18 includes a method comprising accessing, by executing an instruction with a processor, media measurement data communicated via a network from a plurality of media monitors, the media measurement data corresponding to a plurality of panelists, determining, by executing an instruction with the processor, a first number of the panelists exposed to a first quantity of a first broadcast, determining, by executing an instruction with the processor, a second number of the panelists exposed to a second quantity of the first broadcast, and outputting, by executing an instruction with the processor, a consistency metric associated with the first broadcast, the consistency metric based on a variation of at least the first number and the second number.

Example 19 includes the method of example 18, wherein the first quantity corresponds to a first number of intervals of the first broadcast and the second quantity corresponds to a second number of intervals of the first broadcast.

Example 20 includes the method of example 19, wherein at least some intervals in the first number of intervals are non-contiguous for a first one of the panelists in the first number of the panelists.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   a record manager to access media measurement data communicated via a network from a plurality of media monitors, the media measurement data corresponding to a plurality of panelists;
   a consistency calculator to:
      determine a first reach value corresponding to first media presented on a first plurality of devices;
      determine a second reach value corresponding to second media presented on a second plurality of devices, the second media distinct from the first media;
      in response to a determination that the first reach value is within a threshold of similarity to the second reach value, generate (i) a first consistency metric corresponding to the first media and (ii) a second consistency metric corresponding to the second media;
      output the first consistency metric associated with the first media and the second consistency metric associated with the second media; and
   a consistency manager to adjust an advertising schedule based on at least one of the first consistency metric or the second consistency metric, the adjustment of the advertising schedule to at least switch a first advertisement previously scheduled to be presented at a first time during a broadcast of the first media with a second advertisement different than the first advertisement.

2. The apparatus of claim 1, wherein the consistency calculator is further to determine a first number of panelists that were exposed to a first duration of the first media, the first duration to correspond to a first number of intervals and a second number of panelists that were exposed to a second duration of the second media, the second duration to correspond to a second number of intervals.

3. The apparatus of claim 2, wherein at least some intervals in the first number of intervals are non-contiguous for a first one of the panelists in the first number of the panelists.

4. The apparatus of claim 2, wherein the first number of the panelists includes a first panelist and a second panelist, wherein the record manager is to:
   determine a first set of intervals of the first media to which the first panelist was exposed, a first sum of the first set of intervals being at least as large as the first duration; and
   determine a second set of intervals of the first media to which the second panelist was exposed, a second sum of the second set of intervals being at least as large as the first duration, the second set of intervals of the first media different from the first set of intervals of the first media.

5. The apparatus of claim 2, wherein the consistency calculator is to calculate the consistency metric by dividing (i) an average of at least the first number and the second number by (ii) the variation of the at least the first number and the second number.

6. The apparatus of claim 5, wherein the consistency metric is a coefficient of variation, and the consistency calculator is to calculate the variation to be a standard deviation of at least the first number and the second number.

7. The apparatus of claim 1, wherein the first media corresponds to a first episode of a program, the second media corresponds to a second episode of the program, and the consistency manager is to calculate a loyalty metric based on the first consistency metric and the second consistency metric.

8. The apparatus of claim 1, wherein the media monitors are to capture media presented on a media display of the first plurality of devices.

9. The apparatus of claim 1, wherein the consistency calculator is to generate the first consistency metric by:
   determining a first number of panelists exposed to at least a first quantity of the first media, the first quantity corresponding to a percentage of a total duration of the first media;
   determining a second number of panelists exposed to at least a second quantity of the first media, the second quantity of corresponding to a percentage of a total duration of the first media; and
   calculating the first consistency metric based on a variation among at least the first number of panelists and the second number of panelists.

10. The apparatus of claim 9, wherein the consistency calculator is to generate the second consistency metric by:
   determining a third number of panelists exposed to at least a first quantity of the second media, the first quantity corresponding to a percentage of a total duration of the second media;
   determining a fourth number of panelists exposed to at least a second quantity of the second media, the second corresponding to a percentage of a total duration of the second media, the second quantity greater than the first quantity; and
   calculating the second consistency metric based on a variation among at least the third number of panelists and the fourth number of panelists.

11. The apparatus of claim 10, wherein the first plurality of devices is distinct from the second plurality of devices.

12. A non-transitory computer readable storage medium comprising instructions which, when executed, cause one or more processors to at least:
   access media measurement data communicated via a network from a plurality of media monitors, the media measurement data corresponding to a plurality of panelists;
   determine a first reach value corresponding to first media presented on a first plurality of devices;
   determine a second reach value corresponding to second media presented on a second plurality of devices, the second media different from the first media;
   in response to a determination that the first reach value is within a threshold of similarity to the second reach value, generate (i) a first consistency metric corresponding to the first media and (ii) a second consistency metric corresponding to the second media;
   output the first consistency metric associated with the first media and the second consistency metric associated with the second media; and adjust an advertising schedule based on at least one of the first consistency metric or the second consistency metric, the adjustment of the advertising schedule to at least switch a first advertisement previously scheduled to be presented at a first time during a broadcast of the first media with a second advertisement different than the first advertisement.

13. The computer readable storage medium of claim 12, wherein the computer readable storage medium is further to determine a first number of panelists that were exposed to a first duration of the first media, the first duration to correspond to a first number of intervals and a second number of panelists that were exposed to a second duration of the second media, the second media to correspond to a second number of intervals.

14. The computer readable storage medium of claim 13, wherein at least some intervals in the first number of intervals are non-contiguous for a first one of the panelists in the first number of the panelists.

15. The computer readable storage medium of claim 13, wherein the first number of the panelists includes a first panelist and a second panelist, and the instructions, when executed, cause the one or more processors to:
  determine a first set of intervals of the first media to which the first panelist was exposed, a first sum of the first set of intervals being at least as large as the first duration; and
  determine a second set of intervals of the first media to which the second panelist was exposed, a second sum of the second set of intervals being at least as large as the first duration, the second set of intervals of the first media different from the first set of intervals of the first media.

16. The computer readable storage medium of claim 13, wherein the instructions, when executed, cause the one or more processors to calculate the consistency metric by dividing (i) an average of at least the first number and the second number by (ii) the variation of the at least the first number and the second number.

17. The computer readable storage medium of claim 12, wherein the first media corresponds to a first episode of a program, the second media corresponds to a second episode of the program, and the instructions, when executed, cause the one or more processors to calculate a loyalty metric based on the first consistency metric and the second consistency metric.

18. A method comprising:
  accessing, by executing an instruction with a processor, media measurement data communicated via a network from a plurality of media monitors, the media measurement data corresponding to a plurality of panelists;
  determining, by executing an instruction with the processor, a first reach value corresponding to first media presented on a first plurality of devices;
  determining, by executing an instruction with the processor, a second reach value corresponding to second media presented on a second plurality of devices, the second media distinct from the first media;
  in response to determining that the first reach value is within a threshold of similarity to the second reach value, generating, by executing an instruction with the processor, (i) a first consistency metric corresponding to the first media and (ii) a second consistency metric corresponding to the second media;
  outputting, by executing an instruction with the processor, the first consistency metric associated with the first media and the second consistency metric associated with the second media; and
  adjusting, by executing an instruction with the processor, an advertising schedule based on at least one of the first consistency metric or the second consistency metric, the adjusting of the advertising schedule including changing a first advertisement previously scheduled to be presented at a first time during a broadcast of the first media with a second advertisement different than the first advertisement.

19. The method of claim 18, further including, determining, by executing an instruction with the processor, a first number of panelists that were exposed to a first duration of the first media, the first duration to correspond to a first number of intervals of the first media and a second number of panelists that were exposed to a second duration of the second media, the second duration to correspond to a second number of intervals of the first media.

20. The method of claim 19, wherein at least some intervals in the first number of intervals are non-contiguous for a first one of the panelists in the first number of the panelists.

* * * * *